US005746922A

United States Patent [19]
Smith et al.

[11] Patent Number: 5,746,922
[45] Date of Patent: May 5, 1998

[54] PROCESS FOR REMOVING CHROMATE ION FROM A CONCENTRATED SOLUTION OF SODIUM SULFATE

[75] Inventors: Paul K. Smith, Roscoe; Eugene P. Bergemann, Hoffman Estates, both of Ill.

[73] Assignee: NTEC Solutions, Inc., Mt. Prospect, Ill.

[21] Appl. No.: 789,657

[22] Filed: Jan. 27, 1997

[51] Int. Cl.$^6$ .................................................. B01D 15/00
[52] U.S. Cl. ............................................ 210/670; 210/684
[58] Field of Search ...................................... 210/670, 684

[56] References Cited

U.S. PATENT DOCUMENTS

| | | | |
|---|---|---|---|
| 3,885,018 | 5/1975 | Smith | 210/684 |
| 3,944,485 | 3/1976 | Rembaum et al. | 210/684 |
| 4,221,871 | 9/1980 | Meitzner et al. | 521/29 |
| 4,224,415 | 9/1980 | Meitzner et al. | 521/38 |
| 4,256,840 | 3/1981 | Meitzner et al. | 521/33 |
| 4,382,124 | 5/1983 | Meitzner et al. | 521/38 |

OTHER PUBLICATIONS

Chanda et al., *Reactive Polymers*, 21:77–88 (1993).
Reilly 5$^{th}$ Edition Product Index
Fréchet et al., *J. Org. Chem.*, 46:1728–1730 (1981).

*Primary Examiner*—Ivars Cintins
*Attorney, Agent, or Firm*—Welsh & Katz, Ltd.

[57] ABSTRACT

A process for removing contaminating levels of hexavalent chromium ion [Cr(VI)] from a concentrated aqueous solution of sodium sulfate. That process includes providing a vessel containing a water-insoluble adsorption medium having a plurality of polymerized pyridyl-containing adsorption sites. An influent of an aqueous solution of about 1.0 to about 2.0 molar (e.g., saturated) sodium sulfate having a total hexavalent chromium ion concentration of up to about 1000 parts per million, to the vessel to contact the insoluble adsorption medium. The solution is maintained in contact with that insoluble adsorption medium for a time period sufficient for the medium to bind the hexavalent chromium ions in the contacting solution. The resulting aqueous solution is discharged from the vessel as an effluent having a total hexavalent chromium ion concentration whose ratio to the total hexavalent chromium ion concentration of the influent is about zero to about $25.0 \times 10^{-6}$.

9 Claims, No Drawings

PROCESS FOR REMOVING CHROMATE ION FROM A CONCENTRATED SOLUTION OF SODIUM SULFATE

DESCRIPTION

1. Field of the Invention

This invention pertains to a process for removing an environmentally hazardous metal contaminant from a large-scale, industrial chemical. More particularly, the present invention relates to an efficient process for selective adsorption of hexavalent chromium ion from a concentrated, aqueous solution of sodium sulfate, thereby rendering the solution suitable for production of solid sodium sulfate for use as a detergent additive or the like without the environmental hazard associated with the presence of chromium.

2. Background of the Invention

A major by-product of chromium salt production is sodium sulfate that is contaminated with unacceptable levels (50 parts per million up to 1000 parts per million) of hexavalent chromium ion [Cr(VI)]. A typical chromium salt manufacturing facility produces hundreds of tons per day of such hexavalent chromium-contaminated sodium sulfate.

Classical chemical treatment of Cr(VI)-contaminated sodium sulfate cake designed to ameliorate toxic levels of chromium includes treatment of a solution (liquor) of the chromium-contaminated sodium sulfate with a reducing agent to produce trivalent chromium [Cr(III)], followed by precipitation of Cr(III) as the hydroxide with sodium hydroxide, further followed by filtration and pH adjustment with sulfuric acid.

Sodium sulfate solid that has been chemically manipulated as discussed to reduce contaminating chromium still exceeds levels of chromium required for "detergent grade" sodium sulfate (less than 25 parts per billion). In addition to failing to produce a more saleable by-product with enhanced value, known chemical methods are slow and labor intensive owing to the multiplicity of process steps and, by the very nature of the Cr(III) hydroxide precipitate that is gelatinous and is difficult to remove by classical filtration techniques.

Usual ion-exchange techniques for reduction of chromium contamination in sodium sulfate liquors also fail owing to the high, competing, ionic strength of the liquors in that the concentration of sulfate anion is so much greater than chromate anion that the chromate is displaced by mass action. Dilution of the sodium sulfate liquor to promote preferential chromium binding to ion-exchange resins is prohibitive from the standpoint of water consumption, equipment size and energy input that are needed to concentrate the dilute, rectified liquor.

It is also to be understood that chromate exists in aqueous solution in a number of ionic forms. At pH values above 6, the yellow $CrO_4^{2-}$ predominates, whereas an equilibrium exists between the $HCrO_4^{1-}$ and the orange-red 2- (dichromate) ions between pH values of about 2 and 6. Some ionized Cr(III) complexes are usually present and produce a greenish color. The main species below pH 1 is $H_2CrO_4$.

Chanda et al. in *Reactive Polymers*, 21:77–88 (1993) compared the abilities of the N-methylated poly(4-vinyl pyridine) (Reillex™ HPQ) and a conventional cross-linked strong base (quaternary ammonium) ion exchange resin, Amberlite® IRA-400 in recovering chromate ion from solutions containing 0.1 mM sodium sulfate and 0.2 mM sodium chloride at an initial chromate concentration of 0.5 mM. Those workers reported that the N-methyl pyridinium ion-containing polymer showed enhanced selectivity for chromate at the salt concentrations studied. They also reported that removal or stripping of the chromate ion from the resins could be accomplished using 2.5M sodium chloride or 0.1N sodium hydroxide.

Those workers also showed that hexavalent chromium ion adsorption decreased as sulfate ion concentration increased. At the pH value for maximal binding (about 6), hexavalent chromium binding decreased 28 percent from a solution containing 100 mM added sulfate as compared to no added sulfate.

Those workers also reported colors when the resins were contacted with the hexavalent chromium ion-containing solutions as a function of pH value. Thus, the N-methyl pyridinium ion-containing resin was a yellow color at pH values greater than 6.5 and less than 6. On the other hand, the quaternary ammonium ion-containing resin (Amberlite® IRA-400) was yellow at pH values above pH 6.5, and was deep orange color at pH values below 6.

The yellow color was ascribed to the $CrO_4^{2-}$ ion at pH values above 6.5, with $HCrO_4^{1-}$ predominating in solution between pH values of 2 and 6.5. The presence of chromate polymeric species such as $Cr_3O_{10}^{2-}$ and $Cr_4O_{13}^{2-}$ and dichromate ($Cr_2O_7^{2-}$) were postulated to be present when in the presence of their quaternary ammonium ion-containing resin because of its about 1M, strongly ionized character as an electrolyte.

Those workers also reported that chromate and bisulfate ions could combine at high bisulfate ion concentrations and acidic pH values to form a so-called mononuclear Cr(VI) complex having the formula $CrSO_7^{2-}$. No evidence was, however, provided for the formation of such species in the solutions there studied. In addition, because the $pK_2$ of $H_2SO_4$ is 2.1, a vanishingly small amount of bisulfate ion would be present at a pH value of 4–5 where maximal preference of the N-methyl pyridinium ion-containing resin was exhibited for chromate ion in the presence of sulfate ion.

It would therefore be unexpected from a study of the Chanda et al. publication that an efficient and economical process could be found that provides for substantially complete separation of hexavalent chromium ions from a relatively high concentration (e.g., about 1 to 2 molar) aqueous solution of sulfate ions in which the ratio of total sulfate ($H_2SO_4+HSO_4^{1-}+SO_4^{2-}$) to total chromate ($H_2CrO_4+Cr_2O_7^{2-}+HCrO_4^{1-}+CrO_4^{2-}$) is about 100:1 or greater.

3. Brief Summary of the Invention

In accordance with the present invention, hexavalent chromium ions can be efficiently and economically removed from concentrated solutions of sodium sulfate to levels of less than 25 parts per billion. Further, as described herein, hexavalent chromium ions removed as a contaminant in sodium sulfate can be readily recovered as a concentrated, alkali dichromate solution suitable for recycling to chromium chemical manufacture, thus obviating the need for chemical reduction, precipitation, slow and laborious filtration and related solids handling.

Contrary to the report of Chanda and Rempel, discussed hereinbefore, the present invention successfully uses Cr(VI) binding to an adsorption medium containing a plurality of pyridyl moieties (groups) in the presence of concentrated (about 1 molar to saturation) sodium sulfate, and in fact, shows that the adsorption medium has an unexpectedly high affinity for hexavalent chromium ions in the presence of high sodium sulfate concentrations.

A contemplated method for reducing the concentration of hexavalent chromium ions in an aqueous solution of sodium sulfate includes providing a vessel containing a water-insoluble adsorption medium having a plurality of pyridyl-containing moieties present as polymerized 2- or 4-vinyl pyridine or 2- or 4-vinyl N—$C_1$–$C_4$ alkyl pyridinium moieties, and preferably N-methyl pyridinium moieties as adsorption sites. An influent of an aqueous solution of about 1.0 to about 2.0 molar sodium sulfate, having a pH value of about 3 to about 6 and an initial total hexavalent chromium ion concentration of about 1.0 to 1000 parts per million is introduced to the vessel to contact the insoluble adsorption medium.

The solution is maintained in contact with the insoluble adsorption medium for a period of time sufficient for the adsorption sites to bind to hexavalent chromium ions in the influent solution and form medium-bound hexavalent chromium (chromate) ions and an aqueous composition. That aqueous composition is subsequently discharged from the vessel as an effluent having a total chromate concentration whose ratio to the total chromate concentration of the influent is about zero to about $25.0 \times 10^{-6}$.

Advantageously, the sodium sulfate contaminated with hexavalent chromium ions and subjected to a process described herein is suitable for use as an enhanced value, environmentally safe "detergent grade" sodium sulfate. Specifically, the present invention unexpectedly and surprisingly demonstrates that a water-insoluble polymerized pyridyl-containing polymeric resin utilized as a hexavalent chromium adsorption medium is able to separate chromate ions from a relatively high concentration solution of sodium sulfate.

The present invention has several benefits and advantages.

One benefit of the invention is that chromium ion-contaminated sodium sulfate can be economically treated to provide "detergent grade" sodium sulfate.

An advantage of the invention is that hexavalent chromium ion can be substantially completely removed from Cr(VI)-containing sodium sulfate and recovered for further use.

Another benefit of the invention is that the above benefits can be achieved with readily available materials.

Another advantage of the invention is that its process is very straight forward to carry out and does not require highly specialized equipment.

Yet another benefit of the invention is that the water-insoluble adsorption medium can be re-used numerous times without loss of capacity or efficiency.

Still further benefits and advantages of the invention will be apparent to the skilled worker from the disclosure that follows.

DETAILED DESCRIPTION OF THE INVENTION

The present invention is directed to a process for removing contaminating levels of hexavalent chromium [Cr(VI)] ion in the form of, for example, $H_2CrO_4$, $Cr_2O_7^{2-}$, $HCrO_4^{1-}$, and $CrO_4^{2-}$ from a concentrated (about 1.0M to saturation) solution of sodium sulfate. Such a process is used for reducing the level of total chromate from a solution of sodium sulfate so that the sodium sulfate can be used, for example, in the manufacture of detergents. It will be recognized by those skilled in the art that the recovery of such commercially usable chemicals is an economically and environmentally sound approach vis-a-vis disposal of the chemicals as waste product.

Typically, in order to "reuse" sodium sulfate, the total chromate concentration should be at or below 25 parts per billion (ppb). This is about the lowest practicably detectable level of chromate concentration.

A process for reducing the concentration of hexavalent chromium ions in an aqueous solution of sodium sulfate is thus contemplated. In accordance with that process, a vessel is provided that contains a water-insoluble adsorption medium having a plurality of adsorption sites that are pyridyl-containing moieties present as polymerized 2- or 4-vinyl pyridine moieties or 2- or 4-vinyl N—$C_1$–$C_4$ alkyl pyridinium moieties, and preferably as N-methyl pyridinium moieties. An influent of an aqueous solution of about 1.0 to about 2.0 molar sodium sulfate, having a pH value of about 3 to about 6 and an initial total hexavalent chromium ion concentration of about 1.0 to 1000 parts per million is introduced to the vessel to contact the insoluble adsorption medium. The solution is maintained in contact with the insoluble adsorption medium for a period of time sufficient for the adsorption sites to bind to hexavalent chromium ions in the influent solution to form medium-bound chromate ions and an aqueous composition. That aqueous composition is subsequently discharged from the vessel as an effluent having a total chromate concentration whose ratio to the total chromate concentration of the influent is about zero to about $25.0 \times 10^{-6}$.

If trivalent chromium, Cr(III), is present in that aqueous solution, the pH value is first adjusted to about 7 to about 8, and then a stoichiometric equivalent, or slight excess, of a strong oxidant such as hydrogen peroxide is added to convert the Cr(III) to Cr(VI). The pH value is readjusted to about 3 to about 6.

The aqueous hexavalent chromium ion-containing aqueous sodium sulfate solution is provided from a suitable chromium salt production waste stream. In a preferred process, the sodium sulfate solution has an initial hexavalent chromium ions concentration of about 50 to 1000 parts per million. Preferably, the effluent stream discharged from the vessel has a total chromate ion concentration of about zero to 25 parts per billion.

A contemplated adsorption medium contains a plurality of adsorption sites that are polymerized pyridyl-containing moieties present as polymerized 2- or 4-vinyl pyridine or 2- or 4-vinyl N—$C_1$–$C_4$ alkyl pyridinium moieties. Use of polymerized 4-vinyl pyridine or 4-vinyl N—$C_1$–$C_4$ alkyl pyridinium moieties (groups) is preferred, with the use of polymerized 4-vinyl N—$C_1$–$C_4$ alkyl pyridinium ion moieties being more preferred. Although $C_1$–$C_4$ alkyl groups such as methyl, ethyl, isopropyl, n-butyl, sec-butyl and the like $C_1$–$C_4$ alkyl groups can be present bonded to the nitrogen of the polymerized pyridyl moiety, N-methyl is a particularly preferred $C_1$–$C_4$ alkyl moiety.

An adsorption medium having N—$C_1$–$C_4$ alkyl groups is preferred over an adsorption medium whose pyridyl moieties are unalkylated because adsorption media free of N-alkylation exhibit oxidative degradation on repeated use. Up to about 80 percent of the pyridyl groups can be alkylated, with use of an adsorption medium having about 60 to about 80 percent of the pyridyl nitrogens alkylated being preferred. Thus, the amount of N—$C_1$–$C_4$ alkylation can be zero to about 80 percent.

A contemplated adsorption medium is also insoluble in water. Such water-insolubility can be achieved by co-polymerizing the pyridyl-containing monomer with a cross-linking agent, and also by use of another co-monomer such as styrene or ethyl styrene that does not react with the hexavalent chromium ions, as are well known. Divinyl benzene is a preferred cross-linking agent, but other cross-linking agents can also be used as is also well known.

In preferred practice, it is contemplated that contact between the hexavalent chromium ion-containing aqueous sodium sulfate solution and the adsorption medium be carried out in a chromatographic column. As such, the adsorption medium is preferably in the form of beads or particles. It is noted, however, that another physical form such as a liquid, powder, membrane, sheet or other web can also be utilized.

Water-insoluble beaded and powdered copolymer adsorption media of 4-vinyl pyridine, divinyl benzene and ethyl styrene are commercially available from Reilly Industries, Inc. of Indianapolis, Ind. (Reilly). These media are sold as Reillex™ 402 (powder; 4-vinyl pyridine, ethyl styrene, divinyl benzene), Reillex™ 402-I (granules; components as above), Reillex™ HP (beads; components as above) and Reillex™ 425 (beads; components as above). The media also differ in exchange capacity [about 8.8 equivalents/kilogram (eq/kg) to about 4.4 eq/kg] and particle size.

Water-insoluble beaded copolymers of 4-vinyl pyridine, divinyl benzene and ethyl styrene having a preponderance of methylated pyridinium residues are commercially available from Reilly as Reillex™ HPQ (an N-methylated version of Reillex™ 425; about 4.6 meq/g dry of total exchange capacity; i.e., strong and weak base) and as PerFix™ adsorption medium (available from NTEC Solutions, Inc. of Mount Prospect, Ill. USA). In these media, approximately 70 percent of the pyridyl residues are N-methylated (about 1–2 molar equivalents of N-methylpyridinium ion per liter of medium) to protect the pyridinium sites from oxidative degradation. PerFix™ adsorption medium is especially preferred for use here. Manufacture of a resin (adsorption medium) preferred for use in carrying out the present process is described in U.S. Pat. No. 4,221,871, No. 4,224,415, No. 4,256,840 and No. 4,382,124, whose disclosures are incorporated herein by reference.

It should be apparent to those skilled in metal ion recovery that a water-insoluble adsorption medium can be solid or liquid, as noted before. It should also be understood that the pyridyl-containing moieties need not themselves form part of a polymer backbone, but can also be grafted onto a previously made polymer, and then preferably N-alkylated to form an adsorption medium having $N-C_1-C_4$ alkyl pyridinium moiety adsorption sites. Thus, for example, a thiol-containing polymer can be reacted with 2- or 4-vinyl pyridine to form polymerized thioethylpyridine groups that can then by N-alkylated with methyl chloride or methyl iodide or the like to form a preferred adsorption medium.

Contact between the adsorption medium and the aqueous sodium sulfate/hexavalent chromium ion-containing solution is maintained for a time period sufficient for the hexavalent chromium ions to be bound by the pyridyl-containing adsorption sites of the medium. That binding is usually quite rapid, with contact times of a few seconds to a few minutes typically being utilized. Much longer contact times such as hours can be utilized with no ill effect being observed.

In one example of the present process, an aqueous solution of 2.0M sodium sulfate (maintained in solution by slight warming to a temperature of about 40° C.) containing contaminating levels of Cr(VI) and adjusted to a pH value of 5–7 is introduced into a vessel, such as by being pumped through or gravity fed over a chromatographic column containing a preferred adsorption medium [N-methylated poly(4-vinyl pyridine)] also known as PerFix™ available from NTEC Solutions, Inc., discussed before. The solution residence time, that is, the time that the solution is in contact with the adsorption medium must be sufficiently long for the pyridyl-containing adsorption sites of adsorption medium to bind the chromate ions. In the present examples, the solution was maintained in contact with the adsorption medium in the column for about ten seconds. The flow, temperature and pressure constraints of the process are dictated primarily by the limitations of the equipment utilized and the resin used in carrying out the invention.

Resin-treated effluent is collected and saved until the adsorption medium capacity is depleted. Adsorption medium depletion is indicated by either visual observation of the resin color that changes from an off-white color to bright orange or by analytical testing. That is, the preferred PerFix™ (Reillex® HPQ) adsorption medium changes color from off-white to bright orange upon binding hexavalent chromium ions in the presence of about 1 to about 2 molar sulfate ions or until colorimetric assays for Cr(VI) indicate chromium discharging from the column.

It is noted that this observed color change; i.e., from white to orange, is contrary to the color noted in the Chanda et al. article noted previously wherein this same type of ion exchange resin was observed to be yellow at all pH values studied in the presence of much lower sodium sulfate ion concentrations. This change in color was quite unexpected.

The identity of the orange-colored species is presently unknown. It is doubted that species is a so-called mononuclear $CrSO_7^{2-}$ complex as the orange color was observed in the preferred pH value range of about 4–5 to about 7, where the concentration of bisulfate ion needed for its formation would about $10^{-4}$ to about $10^{-5}$ of that present at pH 2.1.

Another unexpected finding here is that a contemplated $N-C_1-C_4$ alkyl pyridinium ion-containing adsorption medium would show any preference for chromate ions in the presence of about 1 to about 2 molar sodium sulfate inasmuch as 2.5 molar sodium chloride was used by Chanda et al. to strip the chromate ions from the ion exchange resin. Thus, because the ionic strength of a 2 molar sodium sulfate solution such as that initially containing the chromate ions is about two-times greater than that of the 2.5 molar sodium chloride solution used by Chanda et al. to strip chromate, one might expect little if any chromate to be bound by the adsorption medium from a two molar sodium sulfate solution.

It was observed that one (1) cubic foot of PerFix™ resin bound about 900 grams of chromium metal as Cr(VI), with a commensurate increase in bound weight of the oxide forms of chromium. The total amount of chromium-contaminated sodium sulfate brine that can processed per cubic foot of a contemplated $N-C_1-C_4$ alkylated pyridinium ion-containing adsorption medium such as the preferred PerFix™ resin is governed by the level of the chromium contamination in the feedstock brine. Unexpectedly, the sodium sulfate solution effluent exhibited chromium levels that were not detectable by sensitive analytical means such as atomic adsorption.

Also unexpectedly, the preferred adsorption medium (resin) used in the present process did not degrade under warmed process conditions. It is well known in the art that $CrO_4^{2-}$ in the presence of warm acidic process conditions (e.g., about 165° F.) tends to physically and chemically degrade organic materials, such as organic-based bead resins. However, it was observed that the adsorption, as used in the present process, did not degrade when subjected to the chromium-contaminated sodium sulfate solution. Rather, as discussed herein, it was observed that the adsorption medium could be repeatedly regenerated (e.g., stripped), rinsed and reused, without noticeable physical or chemical degradation of the chromium binding capacity of the resin. The PerFix™ resin that was used can withstand operational pressures of 100 psi and temperatures of 100 degrees C.

A contemplated process successfully removes hexavalent chromium [Cr(VI)] from concentrated sodium sulfate solutions (e.g. 1–2 molar) at temperatures between about 15° C. and 90° C. Preferably, the process is operated at temperatures between about 20° C. and 70° C.

The sodium sulfate effluent solutions rendered free of contaminating chromium levels by this process can be pH adjusted to 7 using sodium hydroxide or other suitable base. The effluent can then be concentrated, crystallized and used or sold as purified sodium sulfate.

The present process successfully removes chromium from a concentrated sodium sulfate solution in a pH range from acidic to about neutral (about pH=1 to about pH=7). Preferably, the process is operated with a solution having a pH value between about 4 and 7, and most preferably, between about 6 and 7. At pH values above about 7, the process begins to lose efficiency and at a pH value of about 14 (e.g., addition of 2.0N NaOH), the adsorption medium is stripped of the bound chromium.

The process has also been shown to operate at a relatively wide range of sodium sulfate concentrations, successfully exhibiting high levels of chromium binding at sodium sulfate concentrations between about 1 molar (about 14 percent concentration by weight) to at least about 2.0M (about 28 percent concentration by weight). Warm temperatures, e.g., about 100° F. to about 165° F., are preferably utilized with solutions contain 2 molar sulfate. Essentially, the process removes chromium from aqueous streams of sodium sulfate up to a saturated solution stream.

The process effectively reduces chromium contaminants from sodium sulfate streams having initial chromium (VI) concentrations of about 50 to about 1000 ppm, and has been observed to reduce the chromium concentrations thereof to about less than 100 parts per billion (ppb), and more particularly down to concentrations between about zero and 25 ppb.

It was also observed that the adsorption medium could be regenerated and reused a number of times. Regeneration of the adsorption medium is preferably accomplished without removing the adsorption medium from the column by contacting the adsorption medium with an aqueous 1–2 molar (N; normal) sodium hydroxide or other strong base solution. The strong base solution is maintained in contact with the adsorption medium for a time period sufficient for the bound Cr(VI) ions to dissolve in the base solution (e.g. a few seconds to minutes) to form a hexavalent chromium ion-containing aqueous solution. Bound hexavalent chromium is essentially completely eluted in 1–2 column volumes of the sodium hydroxide solution. The stripped medium is readied for reuse by washing the column with water (4–5 column volumes) followed by 1–2 column volumes of 0.1N sulfuric acid followed by 4–5 column volumes of water. The resin can be used, stripped and regenerated as described herein and can be used in excess of one hundred (100) cycles without measurable loss in binding capacity or increase in back pressures during operation. Generally, increases in back pressure indicate physical degradation of the adsorption medium.

BEST MODE FOR CARRYING OUT THE INVENTION

EXAMPLE 1

Chromate Removal

Preparation of Resin and Loading of Vessel

Approximately 300 mL of N-methylated poly(4-vinyl pyridine) bead resin, sold under the name PerFix™ as available commercially from NTEC Solutions, Inc. of Mount Prospect, Ill. USA, was slurried with approximately 600 mL of deionized water. The spherical beads were allowed to settle. After about one minute, the colored supernatant was decanted and discarded along with small resin particles, or fines, which did not settle during the first minute. This operation was repeated until the supernatant was colorless and free of fines (5 to 6 cycles of slurry and decantation). This operation was further repeated using 0.1N sulfuric acid in place of deionized water, followed by 4 to 5 additional slurry and decantation cycles with deionized water.

The resin slurry was then charged to a 40×250 mm glass column having a porous fritted glass support and a bottom stopcock until the column contained 280 ml ($1/100$ of a cubic foot) of settled bed volume occupied with resin. In the column that was used in this example, the 280 ml of resin had a bed height of about 190 mm.

Introduction of Hexavalent Chromium Into the Resin Bed as a Water Solution

Five (5) liters of a sample solution containing 1000 parts per million Cr(VI) was prepared by dissolving 14.33 grams of sodium dichromate dihydrate in 5.0 liters of deionized water. The pH value of the resulting solution was 6. No additional salt was added to the solution. The solution was continuously added to the column until the entire solution sample was introduced into and contacted with the resin bed. As the solution was introduced into the resin bed, the color of the resin at the top of the column turned bright orange. As additional chromate solution flowed down into the column, the band of orange color slowly extended down the column, whereas the unused resin at the bottom of the column remaining essentially white.

It was observed that washing the column (3×280 mls) with deionized water did not result in migration of the orange band. It was also observed that Cr(VI) was not detected in the column effluent using the diphenylcarbazide test solution as described by Sandell in Colorimetric Determination of Traces of Metals (visual sensitivity is 1 ppm).

The capacity of the resin was determined by measuring the length of the orange band that formed in the column upon the binding of Cr(VI) to the resin, and comparing the orange colored length to the total length of the resin bed. In the present example, 5.0 grams of chromium (VI) bound to the first 90 mm of resin in a bed having a height of 190 mm. Thus, the capacity of the resin was determined to be approximately 900 gms of chromium (as metal) per cubic foot of resin.

Regeneration of the Resin Bed

The resin column was regenerated using a solution of 1.0N NaOH. The solution was prepared, and about 3 to 4 column volumes (1–1.2 liters) thereof were passed through the column containing the bound Cr(VI). The NaOH solution completely removed the bound hexavalent chromium ions from the resin. The stripping was followed by a 1 liter deionized water wash, and a subsequent 1 liter rinse with the 1.0N sulfuric acid solution followed by an additional 1.0 liter rinse with deionized water.

Throughout the cycles of chromate binding and subsequent regeneration, no indication of oxidative degradation, which could result from the interaction of dichromate ions with the organic resin was observed. Nor was any measurable decrease in the binding capacity of the resin observed after repeated chromate binding and subsequent regeneration cycles.

Similar results are obtained using crosslinked poly(4-vinyl pyridine) (Reillex™ 425).

EXAMPLE 2

Removal of Cr(VI) From 2.0M Sodium Sulfate Solution

Loading the Column

The chromate binding and regeneration steps described before were then carried out using a solution of 2.0 molar (M) sodium sulfate having hexavalent chromium ions, specifically, sodium dichromate, in a concentration of about 1000 ppm, in place of deionized water. The solution was warmed to about 40° C. (104° F.).

The solution was continuously added to the column until the entire solution sample was introduced into and contacted with the resin bed. As the solution was introduced into the resin bed, the color of the resin at the top of the column turned bright orange. As additional dichromate in 2M sodium sulfate solution flowed down into the column, the band of orange color slowly extended down the column, while the unused resin at the bottom of the column remaining essentially white.

Unexpectedly, the capacity of the resin for adsorbing hexavalent chromium in the presence of warm, 2.0M sodium sulfate remained at approximately 900 grams (as metal) per cubic foot of resin. The entire sample of column effluent containing sodium sulfate showed no detectable chromium by atomic adsorption or the diphenylhydrazide assay described above. Thus, similar column capacities were shown in the presence or absence of 2 molar sodium sulfate.

Regeneration of the Column Following Removal of Cr(VI) From the 2.0M Sodium Sulfate Solution The column was regenerated using a solution of 1.0N NaOH in 2.0M $Na_2SO_4$ (sodium sulfate) solution. The NaOH solution was prepared, and about 3 to 4 column volumes (1–1.2 liters) thereof was passed through the column containing the bound Cr(VI). The NaOH solution completely removed the bound chromium from the resin. The stripping (desorption) was followed by a 1 liter deionized water wash and a subsequent 1 liter rinse with 1.0N sulfuric acid solution followed by an additional 1.0 liter rinse with deionized water.

Throughout the cycles of hexavalent chromium ion binding and subsequent regeneration, no indication of oxidative degradation was observed. Nor was any measurable decrease in the binding capacity of the resin observed after repeated chromate binding and subsequent regeneration cycles.

Similar sorption results are observed when cross-linked poly(4-vinyl pyridine) (Reillex™ 425) is utilized. However, some oxidative degradation is observed with that adsorption medium.

Unexpectedly, the use of the N-methylated poly(4-vinyl pyridine) (PerFix™) adsorption medium to remove hexavalent chromium ions from a relatively high concentration of sodium sulfate showed that substantially all of the chromate could be removed from the sodium sulfate solution without adversely impacting binding capacity or the ability to regenerate and reuse the adsorption medium. Inasmuch as chromate removal from a relatively low concentration stream of sodium sulfate has been shown to be diminished 28 percent in a relatively low (0.1M) sulfate concentration, as illustrated in the Chanda et al. paper discussed before, it was unexpected that the adsorption medium would exhibit highly efficient binding capacity for hexavalent chromium ions in aqueous solutions having high sodium sulfate concentrations [e.g., high salt (greater than 1M) concentrations].

Moreover, whereas the chromate sorption in known processes was shown to be reduced by 28 percent in low concentration sodium sulfate solutions (about 0.1M concentration), the present process exhibited almost complete hexavalent chromium ion sorption; i.e., less than 1 ppb chromate in the effluent stream in high sodium sulfate concentration feed streams. In fact, given that the effluent chromate levels of the present process are between about zero ppb and 25.0 ppb, the ratio of the total chromate concentration of the effluent to the influent is about zero to about $25.0 \times 10^{-6}$ (%1000 ppm to 25.0 ppb/1000 ppm, respectively).

It will be recognized by those skilled in the art that the present process can be carried out in both a batch mode and in a continuous, steady state mode. In such a steady state mode, the contact or residence time of the solution with the adsorption medium must be sufficiently long to permit the pyridyl-containing adsorption sites of the adsorption medium to bind to the hexavalent chromium ions. It will also be recognized by those skilled in the art that various methods of regenerating the resin can be used, and that the method of regeneration presented herein is illustrative only and should not be considered to limit the scope of the invention to the regeneration method herein.

From the foregoing, it will be observed that numerous modifications and variations can be effectuated without departing from the true spirit and scope of the novel concepts of the present invention. It is to be understood that no limitation with respect to the specific example presented is intended or should be inferred. The disclosure is intended to cover by the appended claims all such modifications as fall within the scope of the claims.

What is claimed is:

1. A process for reducing the concentration of hexavalent chromium ions in an aqueous solution of sodium sulfate comprising the steps of:

(a) providing a vessel containing a water-insoluble adsorption medium having a plurality of adsorption sites that are pyridyl-containing moieties present as polymerized pyridine or N—$C_1$–$C_4$ alkyl pyridinium moieties;

(b) introducing an influent aqueous solution of about 1.0 molar to saturated sodium sulfate having an initial total hexavalent chromium ion concentration of about 1.0 to about 1000 parts per million to the vessel to contact the insoluble adsorption medium;

(c) maintaining said solution in contact with said insoluble medium for a time period sufficient for said hexavalent chromium ions in the influent to bind to said adsorption sites to form medium-bound chromate ions and an aqueous composition; and (d) discharging the aqueous composition from the vessel as an effluent having a total hexavalent chromium ion concentration whose ratio to the total hexavalent chromium ion concentration of the influent is about zero to about $25.0 \times 10^{-6}$.

2. The process in accordance with claim 1 wherein the sodium sulfate solution has an initial hexavalent chromium ion concentration of about 50 to 1000 parts per million.

3. The process in accordance with claim 1 wherein the effluent has a total hexavalent chromium ion concentration of about zero to 25 parts per billion.

4. The process in accordance with claim 1 wherein said pyridyl-containing moieties are present as polymerized 2- or 4-vinyl N—$C_1$–$C_4$ alkyl pyridinium moieties.

5. A process for reducing the concentration of hexavalent chromium ions in an aqueous solution of sodium sulfate comprising the steps of:

(a) providing a vessel containing a water-insoluble adsorption medium having a plurality of polymerized N—$C_1$–$C_4$ alkyl pyridinium moieties as adsorption sites;

(b) introducing an influent of an aqueous solution of about 1.0 to about 2.0 molar sodium sulfate having an initial total hexavalent chromium ion concentration of about 1.0 to 1000 parts per million to the vessel to contact the adsorption sites;

(c) maintaining said solution in contact with said adsorption medium for a time period sufficient for said adsorption sites to bind to hexavalent chromium ions in the influent to form medium-bound hexavalent chromium ions and an aqueous composition; and (d) discharging said aqueous composition from the vessel as an effluent having a total hexavalent chromium ion concentration of about zero to about 1.0 part per million.

6. The process in accordance with claim 5 wherein said N—$C_1$–$C_4$ alkyl pyridinium moiety is a N-methyl pyridinium moiety.

7. The process in accordance with claim 5 wherein the sodium sulfate solution has an initial hexavalent chromium ion concentration of about 50 to 1000 parts per million.

8. The process in accordance with claim 5 wherein the effluent has a total hexavalent chromium ion concentration of about zero to 25 parts per billion.

9. The process in accordance with claim 5 including the further steps of removing hexavalent chromium ions from the adsorption medium by contacting the medium with an aqueous solution of a strong base and maintaining said contact for a time period sufficient for the hexavalent chromium ions to dissolve to form a hexavalent chromium ion-containing aqueous solution.

\* \* \* \* \*